May 18, 1965
F. E. GOERKE ETAL
3,183,994
AUTOMOTIVE CRUISE CONTROL
Filed Feb. 18, 1963
2 Sheets-Sheet 1
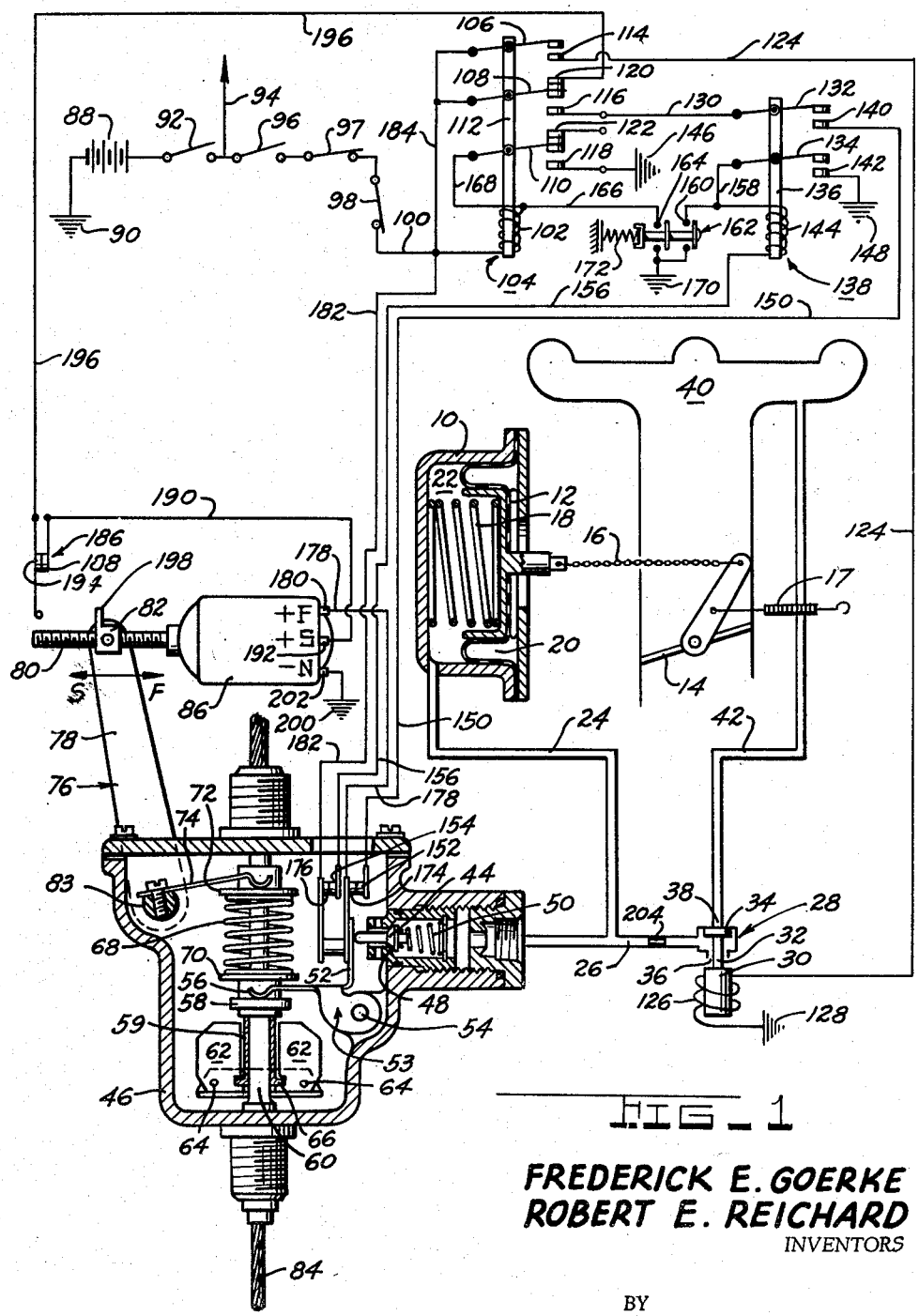
FIG_1
FREDERICK E. GOERKE
ROBERT E. REICHARD
INVENTORS
BY
William N. Antonio
ATTORNEY.

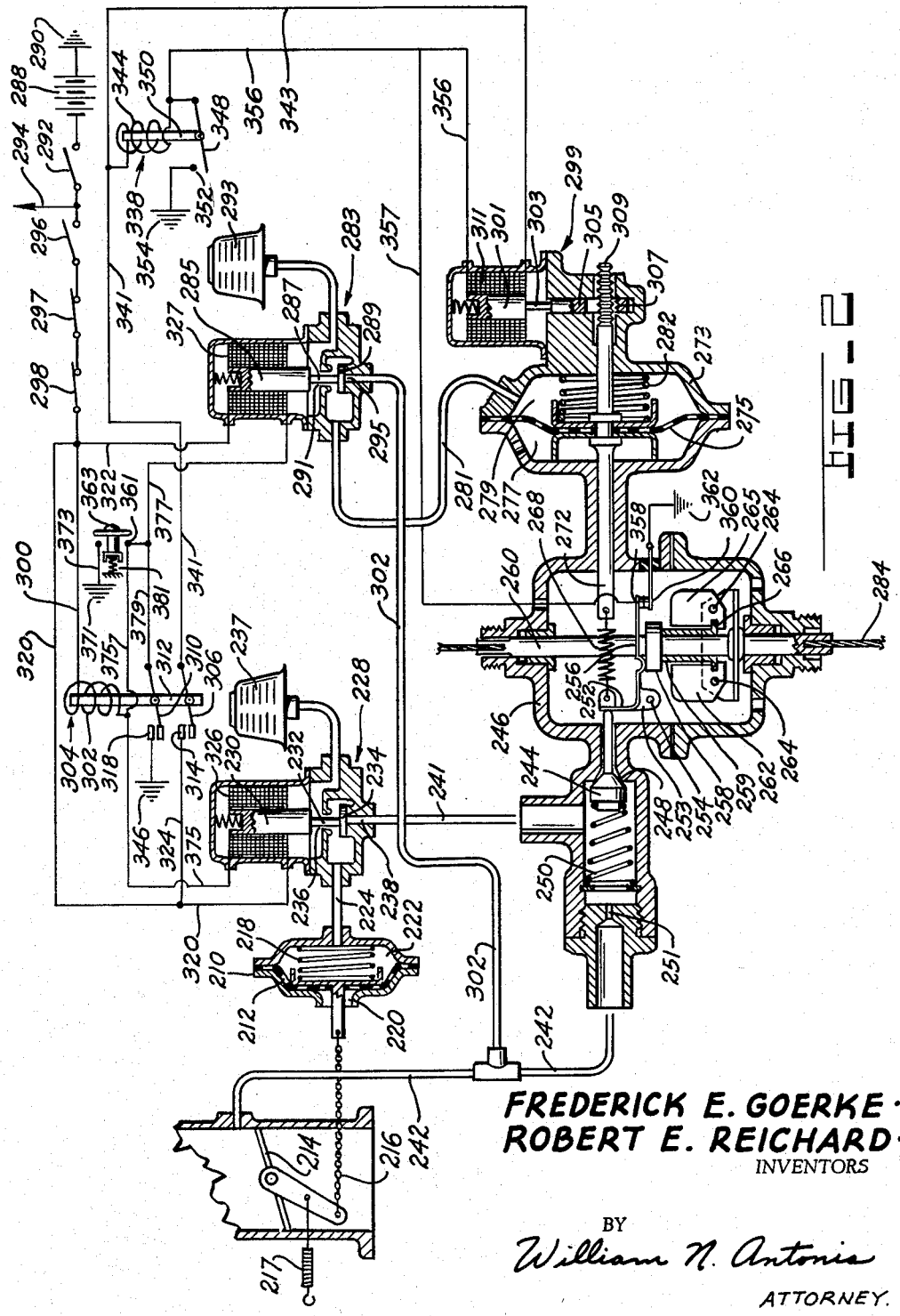

United States Patent Office 3,183,994
Patented May 18, 1965

3,183,994
AUTOMOTIVE CRUISE CONTROL
Frederick E. Goerke and Robert E. Reichard, South Bend, Ind., assignors to The Bendix Corporation, South Bend, Ind., a corporation of Delaware
Filed Feb. 18, 1963, Ser. No. 259,068
15 Claims. (Cl. 180—82.1)

This invention relates to a cruise control system for automatically controlling the speed of an automotive vehicle and more particularly to a cruise control system which provides for automatic speed selection.

One of the objects of this invention is to provide a cruise control system which does not require a speed selector device in the vehicle passenger compartment.

Another object of this invention is to provide a cruise control system which can be rendered operable at the desired vehicle speed solely by actuating a push button.

A further object of this invention is to provide a cruise control system in which speed selection and actuation of the cruise control will occur simultaneously simply by pressing a push button.

More specifically, it is an important object of this invention to provide a cruise control system which, after manually accelerating the vehicle to a desired speed, can be rendered operable to automatically maintain the speed of the vehicle at said desired speed solely by actuation of a manually operable push button located in the vehicle passenger compartment.

Another object of this invention is to provide a cruise control system which will be locked-in and rendered operable to maintain the vehicle at the speed at which the vehicle is travelling when the push button is pushed regardless of accelerator pedal or throttle position.

The above and other objects, features, and advantages of the invention will become apparent from the following description taken in connection with the accompanying drawings which form a part of this invention and in which:

FIGURE 1 shows a speed control system embodying our invention in which the pneumatic and electrical components thereof are schematically and diagrammatically illustrated; and FIGURE 2 shows a speed control system similar to FIGURE 1 in which another embodiment of our invention is illustrated.

Referring to FIGURE 1, it will be seen that our speed control system includes a vaccum power unit 10 having a throttle acutator diaphragm 12 therein which is suitably linked to the engine throttle 14 through means such as chain 16. It will be noted that movement of chain 16 to the left will cause the throttle to open and increase the fuel supply to the engine, such movement being against spring 17 which urges the throttle towards a closed position. A spring 18 is located within the vacuum power unit 10 and urges the diaphragm 12 to a throttle released position. The actuator diaphgram 12 has one side thereof, 20, continually open to atmosphere while the other side thereof, 22, is connected by conduits 24 and 26 to a threeway solenoid valve indicated generally by the numeral 28. The solenoid valve includes an armature 30 connected to a valve stem 32 on which is mounted a valve head 34. This valve has an air port 36 and a vacuum port 38 connected to the engine intake manifold 40 via conduit 42. Conduit 26 communicates with atmosphere via a modulating valve 44 located in governor housing 46. The modulating valve 44 is urged against its valve seat 48 by a spring 50 and is unseated under certain conditions from its valve seat by movement of one arm 52 of a V-shaped lever 53 which pivots about point 54. The other arm 56 of the V-shaped lever abuts a flange 58 formed on a sleeve 59 which is axially movable on governor shaft 60. Also located within the governor housing are a pair of conventional centrifugal weights 62 which are operatively connected to rotatable governor shaft 60 in a suitable manner so that a predetermined speed will cause outward movement of the centrifugal weights about pivotal connections 64, said outward movement causing axial movement of sleeve 59 and flange 58 through contacting collar 66 which is formed on the other end of sleeve 59. Movement of collar 66, sleeve 59, and flange 58 by outward movement of the weights is opposed by a governor load spring 68 confined between flanged member 70, which abuts flange 58 of sleeve 59, and a flanged member 72, which surrounds the governor shaft 60 and is movable relative thereto by one arm 74 of a V-shaped lever 76 having the other arm 78 thereof suitably connected to a threaded member 80 by means such as movable nut member 82. The required preload of spring 68 for a desired cruising speed is determined by the position of the flanged member 72, said position being controlled in a manner to be subsequently described. The governor shaft 60 is suitably connected to a flexible shaft 84 which is adapted to be driven in timed relation with the speed of the vehicle, said flexible shaft preferably being the speedometer drive cable of the vehicle.

As previously stated, outward movement of the centrifugal weights 62 is opposed by governor spring 68 which bears against flanged member 70. The force exerted by this spring determines the vehicle speed at which lever arm 52 will unseat modulating valve 44 from its valve seat 48 and thus permit communication of vacuum chamber 22 of power unit 10 with the atmosphere. The force exerted by spring 68 is determined by a reversible motor 86 which causes rotation of threaded member 80 and consequent movement of V-shaped lever 76 about pivotal connection 83. Such pivotal motion of lever 76 will vary the position of flanged member 72 with respect to flanged member 70 and consequently determine the force exerted by spring 68 against the centrifugal weights 62 of the governor. Thus, if the spring load or force exerted by governor spring 68 is increased, a higher given vehicle speed will be required to unseat modulating valve 44, whereas, if the spring load or force exerted by spring 68 is decerased, a lower given vehicle speed will be required to unseat modulating valve 44. It should be understood that this given speed will be that speed at which the vehicle is traveling when the driver locks in the vehicle cruise control system, and that the method of accomplishing this cruise control speed setting is hereafter described and involes the main novel concept of our invention.

Movement of lever 76 through operation of reversible motor 86 is controlled through means of an electrical circuit which includes a battery 88 having one terminal grounded at 90 and the other terminal connected to an ignition switch 92. Other circuits lead from the ignition switch 92 and are indicated generally by line 94. The cruise control circuit leads from the ignition switch in series to a shift interlock switch 96 which is open in the park, neutral, and reverse positions but is closed in the drive positions, and continues to a service brake switch 97 and an emergency brake switch 98, both of which are normally closed, but which will open upon application of their associated brakes. Although the shift interlock switch is defined in terms of automatic transmission gear shift settings, it will be understood by those skilled in the art that certain adaptations in the control circuit would permit the use of our invention in an automobile which does not have an automatic transmission.

From the emergency brake switch 98 the cruise control circuit continues through conductor 100 to coil 102 of relay 104. Movable contacts 106, 108 and 110 are controllably linked to armature 112 of the relay 104 and are adapted to cooperably and simultaneously engage the contacts 114, 116 and 118, respectively, when the coil 102 is energized. When the coil 102 is de-energized movable contacts 108 and 110 will engage the contacts 120 and 122, respectively, and movable contact 106 will be in a non-engaging position. Contact 114 is connected by conductor 124 to coil 126 of solenoid valve 28 and thence from coil 126 to ground at 128. Contact 116 is connected by conductor 130 to movable contact 132, which along with movable contact 134, is controllably linked to armature 136 of relay 138. Both of the movable contacts 132 and 134 are adapted to cooperably and simultaneously engage the contacts 140 and 142, respectively, when the coil 144 is energized. Contact 118, which is associated with relay 104, and contact 142, which is associated with relay 138, are connected to ground at 146 and 148, respectively. Contact 140 is connected by conductor 150 to one of two fixed contacts located in governor housing 46, namely contact 152, the other of which, namely contact 154, being connected to coil 144 of relay 138 by conductor 156. Coil 144 is also connected to movable contact 134 via conductor 158 and to one pole 160 of double pole push button 162. The other pole 164 of the double pole push button is connected to coil 102 of relay 104 by conductor 166 and thence to movable contact 110 by conductor 168. Both of the poles 160 and 164 of the double pole push button 162 are connected to ground at 170 when push button 162 is actuated. A spring 172 urges push button 162 to a position out of contact with poles 160 and 164.

Fixedly connected to arm 52 of lever 53 located within the governor housing 46 are two movable contacts 174 and 176 which are adapted to cooperably and simultaneously engage the fixed contacts 152 and 154, respectively. One of the movable contacts 174 is connected by conductor 178 to the reversible motor 86 at 180, whereas the other movable contact 176 is connected by conductor 182 to coil 102 of relay 104 through conductor 100 and to movable contacts 106 and 108 of relay 104 through conductor 184. A limit switch 186 has a fixed contact 188 which is connected by conductor 190 to the reversible motor 86 at 192 and a movable contact 194 which is connected by a conductor 196 to fixed contact 120. The limit switch will be opened when contacted by projection 198 of nut member 82. The reversible motor is connected to ground at 200 through connection 202.

Operation of the speed control system of FIGURE 1 will be as follows: During manual operation of the vehicle at a given speed, for example 60 m.p.h., ignition switch 92, shift interlock switch 96, brake switch 97 and emergency brake switch 98 will all be closed. In addition, movable contacts 108 and 110 of relay 104 will be in engagement with contacts 120 and 122, respectively, and movable contacts 174 and 176 located in the governor housing 46 and connected to arm 52 of lever 53 will be in engagement with contacts 152 and 154, respectively.

When the double pole push button 162 is actuated, current will flow from the battery 88 through conductor 100 and coil 102 of relay 104, the conductor 166 to the pole 164, and thence to ground at 170. Thus, coil 102 will become energized and the armature 112 will be moved to a position whereby movable contacts 106, 108 and 110 will engage contacts 114, 116 and 118, respectively. At the same time actuation of push button 162 will similarly cause energization of coil 144 of relay 138 and consequent movement of armature 136 to a position whereby movable contacts 132 and 134 will engage contacts 140 and 142, respectively. It will be noted that engagement of movable contact 110 with contact 118 and movable contact 134 with contact 142 will hold relays 104 and 138, respectively, in their operative positions even after push button 162 has been released.

Upon actuation of relays 104 and 138, two circuits are energized. The first is through engagement of contacts 106 and 114 whereby coil 126 of solenoid valve 28 is energized through conductor 124. This will cause the armature 30 of the solenoid valve 28 to move the valve head 34 to a position whereby air port 36 will be closed off and vacuum port 38 will be opened for communication with chamber 22 of power unit 10. At the same time a second circuit is energizezd whereby power is supplied to the motor to cause rotation of the threaded member 80 in a direction which will cause the nut member 82 to move axially on the threaded member in the direction "F," thereby causing lever 76 to increase the load on spring 68. This power is conveyed through engagement of contacts 108 and 116 of relay 104, conductor 130, engagement of contacts 132 and 140 of relay 138, conductor 150, engagement of contacts 152 and 174 in the governor housing 46, and conductor 178 which is connected to reversible motor 86 at 180. As soon as the lever 76 has loaded the governor loading spring 68 enough to cause disengagement of contacts 152, 174 and 154, 176, the motor 86 will stop and the lever 76 will be held at this position, since such disengagement of these contacts will cause relay 138 to release and no further power will be given to the motor for movement of nut 82 in the direction "F" until the push button 162 is reactuated. In this manner, the force exerted by spring 68 is varied to coinicde with the spring force which is necessary to control the unseating of modulating valve 44 for the vehicle speed which occurred at the moment when push button 162 was actuated. The governor will control the modulating valve 44 at this automatic setting and the vehicle will maintain the speed at which the vehicle was travelling when push button 162 was actuated, said speed being determined by the point at which disengagement of contacts 152, 174 and 154, 176 occurs. It should be understood that these contacts are installed so as to disengage at the moment when the governor is loaded sufficiently to maintain the vehicle at the desired speed, namely that speed at which the vehicle was travelling when the push button 162 was actuated.

Upon application of the vehicle brakes, brake switch 97 will open and will thus cause de-energization of coil 102 of relay 104. Such de-energization will result in movement of armature 112 to a position which will cause movable contact 108 to engage contact 120 and movable contact 110 to engage contact 122. This action will provide power to the reversible motor 86 and will cause the motor to move the nut 82 and lever arm 78 in the "S" direction until projection 198 opens limit switch 186. At this point, the loading spring 68 is no longer loaded and the cruise control system will not operate because de-energiztaion of solenoid valve 28, which occurs upon disengagement of contacts 106, 114, will prevent communication between vacuum chamber 22 and the vacuum supply of the engine intake manifold 40. The cruise control system may subsequently be activated simply by pushing push button 162 and the vehicle speed will be automatically maintained at the speed at which the vehicle is travelling when the push button is pushed.

The pneumatic system, which is similar to that described in copending application Serial No. 184,073, is brought into operation by energization of solenoid valve 28. Such energization causes valve head 34 to block off air port 36 and open vacuum port 38 so that chamber 22 of vacuum power unit 10 will be communicated with vacuum. At this time the resulting differential pressure acting across the diaphragm 12 will cause the diaphragm 12 to move against spring 18 to a position which will maintain the throttle 14, through means of chain 16, at the necessary setting for maintaining the vehicle at the desired speed. Modulating valve 44, which is controlled by centrifugal weights 62, is responsive to variations in vehicle speed and regulates the degree of vacuum in chamber 22 of power unit 10 by communicating this chamber with atmosphere via restriction 204 (located in conduit 25) when it, the modulating valve, is open and preventing communication with atmosphere when it is closed. For example, if the speed of the vehicle increases as it descends a hill, increased movement of the centrifugal weights 64 in an outward direction will cause arm 52 of lever 53 to maintain the modulating valve 44 in an unseated position. Such a valve position will permit a regulated amount of atmospheric pressure to be communicated to the vacuum chamber 22 thereby causing a slight reduction in the amount of vacuum in this chamber. As a result, pressure responsive element 12 will move in a direction tending to close throttle 14 and reduce the fuel supply to the engine and consequently the speed of the vehicle. In effect, modulating valve 44 will continually move towards or away from its valve seat 48 as the speed of the vehicle tends to change because of variations in the road conditions. As previously described, the pneumatic cruise control system can be rendered inoperable simply by applying the service or emergency brakes and opening either switches 97 or 98. In a serious emergency, turning the ignition off would be sufficient.

In FIGURE 2, which illustrates another embodiment of our invention, like parts are generally designated by like numerals plus 200. Thus, the speed control system includes a vacuum power unit 210 having a diaphragm 212, which is linked to throttle 214 through chain 216, and a spring 218, which opposes movement of the diaphragm. A spring 217 urges the throttle towards a closed position. Chamber 220 of power unit 210 communicates continually with the atmosphere, whereas chamber 222 is connected by conduit 224 to a three-way solenoid valve 228. The solenoid valve includes an armature 230, a valve stem 232, a valve head 234, an air port 236 which communicates with an air cleaner 237 and a vacuum port 238 which is connected to the engine intake manifold by conduit 241, restriction 251, and conduit 242.

A modulating valve 244 is located in governor housing 246 and is urged against its valve seat 248 by spring 250. The valve can be unseated from its valve seat by arm 252 of V-shaped lever 253 which pivots about point 254. Arm 256 of the lever abuts flange 258 formed on a sleeve 259 which is axially movable on governor shaft 260. A pair of centrifugal weights 262 are operatively connected to the governor shaft so that outward movement of the weights about pivotal connections 264 will cause axial movement of sleeve 259 and flange 258 through contacting collar 266 which is formed on the other end of sleeve 259. Such axial movement of the sleeve 259 will cause lever 253 to pivot about point 254, thereby unseating modulating valve 244. Pivotal movement of V-shaped lever 253 about point 254 is opposed by a governor tension spring 268, one end of which is suitably connected to arm 252 of the lever, and the other end of which is suitably connected to an axially movable rod 272. The tension of spring 268 is determined by the position of rod 272, said position being controlled in a manner to be subsequently described. The governor shaft 260 is suitably connected to a flexible shaft 284 which is adapted to be driven in timed relation with the speed of the vehicle, said flexible shaft preferably being the speedometer drive cable of the vehicle.

In this embodiment outward movement of the centrifugal weights is opposed by the tension of governor spring 268 on arm 252 of lever 253. As in the embodiment of FIGURE 1, the force exerted by this spring determines the vehicle speed at which lever arm 252 will unseat modulating valve 244 and thus permit communication of vacuum chamber 222 of power unit 210 with the atmosphere. Instead of utilizing a reversible electric motor, as in the FIGURE 1 embodiment, for determining the force exerted by spring 268, in the instant embodiment the force is determined by a pneumatic system which controls the position of rod 272.

Specifically, this pneumatic system includes a governor loading cylinder 273 having a diaphragm 275 therein which is suitably connected to rod 272 so that movement of the diaphragm will cause concomitant movement of the rod. One side of diaphragm 275, namely chamber 277, communicates continually with the atmosphere, whereas the other side of the diaphragm, namely chamber 279, is connected by conduit 281 to a three-way solenoid valve 283, which is similar to solenoid 228. A spring 282 urges the diaphragm to the left. Solenoid 283 includes an armature 285, a valve stem 287, a valve head 289, an air port 291 which communicates with an air cleaner 293, and a vacuum port 295 which is connected to the engine intake manifold by conduits 302 and 242.

Once rod 272 has been moved to the desired position by diaphragm 275, it can be locked in position by a locking solenoid mechanism indicated generally by the numeral 299. This locking solenoid includes an armature 301, a stem 303, and a locking member 305 having internal serrations 307 formed thereon for engaging the serrations 309 formed on the end of rod 272.

The electrical circuit for operating this embodiment of our cruise control system includes a battery 288 having one terminal grounded at 290 and the other terminal connected to an ignition switch 292. Other circuits lead from the ignition switch and are indicated generally by line 294. The cruise control circuit leads from the ignition switch in series to a shift interlock switch 296 which is open in the park, neutral and reverse positions, but is closed in the drive positions, and continues to a service brake switch 297 and an emergency brake switch 298 both of which are normally closed but which will open upon application of their associated brakes.

From the emergency brake switch 298, the cruise control circuit continues through conductors 300, 320 and 322 to coil 302 of relay 304, coil 326 of solenoid valve 228, and coil 327 of solenoid valve 283, respectively. Pole 361 of single pole push button 363 is connected to ground at 371 by conductor 373 when the push button is actuated, to coil 302 of relay 304 and coil 326 of solenoid valve 228 by conductor 375, to coil 327 of solenoid valve 283 by conductor 377, and to movable contact 310 of relay 304 by conductor 379. Spring 381 urges push button 363 to a position out of contact with pole 361. Movable contacts 306 and 310, are controllably linked to armature 312 of the relay 304 and are adapted to cooperably and simultaneously engage the contacts 314 and 318, respectively, when the coil 302 is energized. When the coil 302 is de-energized, movable contacts 306 and 310 will be in the disengaged position indicated on the drawing. Contact 314, which is associated with relay 304, is connected by conductor 324 to conductor 320, and contact 318, which is associated with relay 304, is connected to ground at 346. Movable contact 306 of relay 304 is connected via conductor 341 to coil 344 of relay 338 and to coil 311 of locking solenoid 299 via conductor 343. Movable contact 348 is controllably linked to armature 350 of relay 338 and is adapted to engage contact 352, which is connected to ground at 354, when coil 344 is energized. Movable contact 348 and coil 344 are also connected to coil 311 of locking solenoid 299 by conductor 356 and by conductor 357 to movable contact 358 which is attached to arm 256 of governor lever 253. Fixed contact 360, which is associated with movable contact 358 is connected to ground at 362.

Operation of the speed control system of FIGURE 2 will be as follows: During manual operation of the vehicle at a given speed, for example, 60 m.p.h., ignition switch 292, shift interlock switch 296, brake switch 297 and emergency brake switch 298 will all be closed. Before actuation of the cruise control system of push button 363, the governor loading cylinder diaphragm 275 will be in the release position shown in FIGURE 2. When the diaphragm is in this release position the governor spring 268 will be in its minimum speed position and the governor switch formed by contacts 358 and 360 will be closed until the minimum speed is reached. Above the minimum speed the switch contacts are broken.

If the vehicle is travelling at 60 m.p.h., and it is desired to place the vehicle under cruise control, all that is necessary is to actuate push button 363. When this is done double pole relay 304 is energized and is held in its operative position by engagement of movable contact 310 with contact 318 after release of push button 363. Engagement of movable contact 306 of relay 304 with contact 314 will provide power to the locking solenoid 299 and its hold-in relay 338.

At the same time double pole relay 304 is actuated, solenoid valves 228 and 283, which allow vacuum to enter the throttle actuating power unit 210 and the governor loading cylinder 273, respectively, are opened to controlled vacuum (note restriction 251) and manifold vacuum, respectively. Such action will cause a differential pressure across diaphragm 275 and will result in its moving to the right against spring 282 thereby increasing the governor spring force on the governor lever 253. As the force of governor spring 268 overcomes the force exerted by outward movement of the centrifugal weights 262, the governor lever arm 256 will move downwardly and cause engagement of contacts 358 and 360. When this switch 358, 360 is closed both the locking solenoid 299 and its hold-in relay 348 will be energized and will lock-in. Such energization of the locking solenoid will cause the internal serrations 307 of locking member 305 to engage the serrations 309 formed on the end of rod 272 and thus hold the diaphragm 275 in the position which will provide the necessary spring force for maintaining a 60 m.p.h. cruise control speed. This position of diaphragm 275 will be maintained until the brake switch or one of the other switches is opened. Load variation on the governor loading cylinder due to manifold vacuum change will not affect the control speed once the locking solenoid is engaged. As previously stated, a simple brake application will return the vehicle to manual control. The cruise control system will not be operative until the operator reactivates it by pressing push button 363. As in the previous embodiment, the cruise control speed will be that speed at which the vehicle is travelling when the push button is applied. The pneumatic system of the FIGURE 2 system functions in effectively the same manner as the system of FIGURE 1 and will not be described again.

The several practical advantages which flow from both of the above described embodiments of our cruise control system are believed to be obvious from the above. For example, one of the advantages of our cruise control embodiments over other known cruise controls is that speed selection is obtained without the use of a control device in the vehicle passenger compartment. Nothing is required of the vehicle operator except that he manually accelerate the vehicle to the desired speed at which time actuation of the cruise control push button by the vehicle operator will lock-in the cruise control system. The cruise control system will then automatically maintain the vehicle at the desired speed. Furthermore, our cruise control systems are independent of accelerator pedal settings. In other words, it is the vehicle speed and not the accelerator pedal setting which determines the controlling cruise control speed. Thus, if the push button is actuated while the car is going 50 m.p.h., then 50 m.p.h. will be the controlling speed. In addition, the vehicle may be manually oversped when necessary by pressure on the accelerator pedal and the vehicle will return to the controlling cruise control speed upon release of the accelerator pedal.

Although we have shown our invention as being operated by vacuum, which is available in the intake manifold of the engine of the vehicle, other pressure fluids which are available in an automotive vehicle may also be utilized. For example, in a vehicle powered by a gas turbine engine, the controlling medium could be compressor pressure rather than manifold vacuum. Accordingly, when the term "fluid pressure" is referred to in the claims, it is intended that such expression be broad enough to cover any suitable fluid pressure which is available in vehicles of this character and to include vacuum.

Furthermore, although this invention has been described in connection with certain specific embodiments, it will be obvious to those skilled in the art that various changes may be made in the form, structure, and arrangement of parts without departing from the spirit of the invention. Accordingly, we do not desire to be limited to the specific embodiments disclosed herein primarily for purposes of illustration, but instead desire protection falling within the scope of the appended claims.

Having thus described the various features of this invention, what we claim as new and desire to secure by Letters Patent is:

1. In a cruise control system for an automotive vehicle having an engine and a driver operated throttle control member for controlling the fuel supply to the engine, a power unit having a pressure responsive element located therein, said pressure responsive element being operatively connected to said throttle control member for controlling movement thereof, fluid pressure means for causing movement of said pressure responsive element, means for controlling the application of said fluid pressure to said pressure responsive element, modulating valve means operatively connected to said power unit for regulating and controlling the application of said fluid pressure to said pressure responsive element, speed responsive means operatively connected to said modulating valve means for controlling movement thereof at predetermined speeds, said speed responsive means including variable force means for determining the speed at which movement of said modulating valve means occurs, manually operable actuating means for rendering said cruise control system operable, and motor means operatively connected to said variable force means and said actuating means, said motor means including a reversible electric motor having a screw and nut connection operatively connected to said variable force means for varying and setting the effective force of said variable force means to that value which is necessary for automatic maintenance of vehicle speed at the speed occurring during actuation of said manually operable means.

2. In a cruise control system for an automotive vehicle having an engine and a driver operated throttle control member for controlling the fuel supply to the engine, a power unit having a pressure responsive element located therein, said pressure responsive element being operatively connected to said throttle control member for controlling movement thereof, fluid pressure means for causing movement of said pressure responsive element, means for controlling the application of said fluid pressure to said pressure responsive element, modulating valve means operatively connected to said power unit for regulating and controlling the application of said fluid pressure to said pressure responsive element, speed responsive means operatively connected to said modulating valve means for controlling movement thereof at predetermined speeds, said speed responsive means including variable force means for determining the speed at which movement of said modulating valve means occurs, manually operable actuating means for rendering said cruise control system operable, motor means operatively connected to said variable force means and said actuating means, said motor means including a fluid pressure loading cylinder having a pressure responsive member therein operatively connected to said variable force means for varying and setting the effective force of said variable force means to that value which is necessary for automatic maintenance of vehicle speed at the speed occurring during actuation of said manually operable means, solenoid valve means for communicating said fluid pressure means with said pressure responsive member, and locking solenoid means operatively connected to said pressure responsive member for preventing movement thereof.

3. In a cruise control system for an automotive vehicle having an engine and a driver operated throttle control member for controlling the fuel supply to the engine, a power unit having a pressure responsive element located therein, said pressure responsive element being operatively connected to said throttle control member for controlling movement thereof, fluid pressure means for causing movement of said pressure responsive element, solenoid valve means for controlling the application of said fluid pressure to said pressure responsive element, modulating valve means operatively connected to said power unit for regulating and controlling the application of said fluid pressure to said pressure responsive element, speed responsive governor means operatively connected to said modulating valve means for controlling movement thereof at predetermined speeds, said governor means including a variable governor load spring for determining the speed at which movement of said modulating valve means occurs, manually operable actuating means for rendering said cruise control system operable, and speed controlled means operatively connected to said variable governor load spring and said actuating means for varying and setting the effective force exerted by said spring to that value which is necessary for automatic maintenance of vehicle speed at the speed occurring during actuation of said manually operable means.

4. The combination defined in claim 3 wherein the means operatively connected to said variable governor load spring and said manually operable actuating means includes a reversible electric motor having a screw and nut connection operatively connected to said governor load spring for varying and setting the effective force exerted by said governor load spring.

5. The combination defined in claim 4, wherein said manually operable actuating means is connected to first and second electrical control circuits, said first circuit being arranged to energize said solenoid valve upon manual operation of said actuating means and thereby permit communication of fluid pressure to said power unit, and said second circuit being arranged to actuate said reversible electric motor upon manual operation of said actuating means.

6. The combination defined in claim 5 wherein said second electrical circuit also includes a limit switch which upon opening will deactuate said reversible motor, said limit switch being arranged to be opened by the mechanical connection between said reversible motor and said governor spring when the reversible motor and said governor spring when the reversible motor causes movement of said mechanical connection in a direction tending to decrease the force exerted by the governor spring.

7. The combination defined in claim 5 wherein said second electrical circuit includes a governor switch which upon opening will deactuate said reversible motor and prevent further variance of the effective force exerted by said governor load spring, said governor switch being operatively connected to said governor load spring and being opened by said spring when the force exerted thereby is equal to that value which is necessary for automatic maintenance of vehicle speed at the speed occurring during actuation of the manually operable means.

8. The combination defined in claim 3 wherein the means operatively connected to said variable governor load spring and said manually operable actuating means includes a fluid pressure governor loading cylinder having a pressure responsive member therein operatively connected to said governor loal spring for varying and setting the effective force exerted by said governor load spring, second solenoid valve means for communicating said fluid pressure means with said pressure responsive member, and locking solenoid means operatively connected to said pressure responsive member for preventing movement thereof.

9. The combination defined in claim 8 wherein said manually operable actuating means is connected to first, second and third electrical control circuits, said first and second circuits being arranged to respectively energize said first mentioned solenoid valve and said second solenoid valve means upon manual operation of said actuating means and thereby respectively permit communication of fluid pressure to the pressure responsive element of said power unit and to the pressure responsive member of said governor loading cylinder, and said third circuit being arranged to energize said locking solenoid means and prevent further movement of said pressure responsive member when the requisite effective force of said governor load spring is attained.

10. The combination defined in claim 9 wherein said third electrical circuit includes a govenor switch which upon closure will cause energization of said locking solenoid means and prevent forther variance of the effective force exerted by said governor load spring, said governor switch being operaively connected to said governor load spring and being closed by said governor load spring when the force exerted thereby is equal to that value which is necessary for automatic maintenance of vehicle speed at the speed occurring during actuation of said manually operable means.

11. In a cruise control system for an automative vehicle having an internal combustion engine and a driver operated throttle control member for controlling the fuel supply to the engine, a vacuum power unit having a pressure responsive element located therein, said pressure responsive element being operatively connected to said throttle control member for regulating and controlling movement thereof, passage means for communicating vacuum from the intake manifold of said engine to one side of said pressure responsive element, valve means having a first position for communicating atmospheric pressure to said one side of said pressure responsive element and a second position for preventing communication therebetween, solenoid means operatively connected to said valve means for causing movement thereof from said first position to said second position upon energization of said solenoid means, second passage means for communicating atmospheric pressure to said one side of said pressure responsive element, modulating valve means having open and closed positions, said modulating valve means being located in said second passage means for regulating the degree of communication between the atmosphere and said one side of said pressure responsive element via said second passage means, governor means responsive to the speed of the vehicle, said governor means comprising a centrifugally operating weight mechanism for moving said modulating valve to an open position at speeds above a predetermined value, and an adjustable governor spring operatively connected to said weight mechanism for determining the speed at which the modulating valve will be moved to an open position by said weight mechanism, manually operable push button means for rendering said cruise control system operable, and speed controlled means operatively connected to said adjustable governor spring and said actuating means for automatically adjusting and setting the effective force exerted by said governor spring to that value which is necessary for automatic maintenance of vehicle speed at the speed occurring during actuation of said push button means.

12. The combination defined in claim 11 wherein the means operatively connected to said adjustable governor spring and said actuating means includes motor means for adjusting and setting the effective force exerted by said governor spring, and an electrical control circuit for rendering said motor means inoperative, said electrical control circuit including governor switch means operatively connected to said governor spring and having a first position for permitting operation of said motor means and a second position for preventing operation of said motor means, said governor switch being moved to said second position by said governor spring when the force exerted thereby is equal to that value which is necessary for automatic maintenance of vehicle speed at the speed occurring during actuation of said push button means.

13. In a cruise control system for an automotive vehicle having an internal combustion engine and a driver operated throttle control member for controlling the fuel supply to the engine, a vacuum power unit having a pressure responsive element located therein, said pressure responsive element being operatively connected to said throttle control member for regulating and controlling movement thereof, passage means for communicating vacuum from the intake manifold of said engine to one side of said pressure responsive element, valve means having a first position for communicating atmospheric pressure to said one side of said pressure responsive element and a second position for preventing communication therebetween, first solenoid means operatively connected to said valve means for causing movement thereof from said first position to said second position upon energization of said first solenoid means, second passage means for communicating atmospheric pressure to said one side of said pressure responsive element, modulating valve means having open and closed positions, said modulating valve means being located in said second passage means for regulating the degree of communication between the atmosphere and said one side of said pressure responsive element via said second passage means, governor means responsive to the speed of the vehicle, said governor means comprising a centrifugally operating weight mechanism for moving said modulating valve to an open position at speeds above a predetermined value, an adjustable governor spring operatively connected to said weight mechanism for determining the speed at which the modulating valve will be moved to an open position by said weight mechanism, reversible electric motor means mechanically connected to said adjustable governor spring for adjusting and setting the effective force exerted by said governor spring to that value which is necessary for automatic maintenance of vehicle speed at the speed occurring during actuation of said cruise control system, manually operable electrical push button means for actuating said cruise control system, said manually operable means being connected to first and second electrical circuits, the first of which is arranged to energize said solenoid valve and thereby permit communication of vacuum to said power unit and the second of which is arranged to actuate said reversible motor, said second electrical circuit including a governor switch which upon opening will deactuate said reversible motor and prevent further variance of the effective force exerted by said governor spring, said governor switch being operatively connected to said governor spring and being opened by said spring only when the force exerted thereby is equal to that value which is necessary for automatic maintenance of vehicle speed at the speed occurring during actuation of the manually operable push button means.

14. In a cruise control system for an automotive vehicle having an internal combustion engine and a driver operated throttle control member for controlling the fuel supply to the engine, a vacuum power unit having a pressure responsive element located therein, said pressure responsive element being operatively connected to said throttle control member for regulating and controlling movement thereof, passage means for communicating vacuum from the intake manifold of said engine to one side of said pressure responsive element, valve means having a first position for communicating atmospheric pressure to said one side of said pressure responsive element and a second position for preventing communication therebetween, first solenoid means operatively connected to said valve means for causing movement thereof from said first position to said second position upon energization of said first solenoid means, second passage means for communicating atmospheric pressure to said one side of said pressure responsive element, modulating valve means having open and closed positions, said modulating valve means being located in said second passage means for regulating the degree of communication between the atmosphere and and said one side of said pressure responsive element via said second passage means, governor means responsive to the speed of the vehicle, said governor means comprising a centrifugally operating weight mechanism for moving said modulating valve to an open position at speeds above a predetermined value, an adjustable governor spring operatively connected to said weight mechanism for determining the speed at which the modulating valve will be moved to an open position by said weight mechanism, a fluid pressure governor loading cylinder having a pressure responsive member therein operatively connected to said governor spring for adjusting and setting the effective force exerted by said governor spring to that value which is necessary for automatic maintenance of vehicle speed at the speed occurring during actuation of said cruise control system, third passage means for communicating vacuum from the intake manifold of said engine to one side of said pressure responsive member, third valve means having a first position for communicating atmospheric pressure to said one side of said pressure responsive member and a second position for preventing communication therebetween, second solenoid means operatively connected to said third valve means for causing movement thereof from said first position to said second position upon energization of said second solenoid means, mechanical locking means operatively connected to said pressure responsive member, said mechanical locking means having a first position for permitting unhindered movement of said pressure responsive member and a section position for preventing movement thereof, third solenoid means operatively connected to said mechanical locking means for causing movement thereof from said first position to said second position upon energization of said third solenoid means, manually operable electrical push button means for actuating said cruise control system, said manually operable means being connected to first, second and third electrical control circuits, the first and second of which are arranged to respectively energize said first and second solenoid means and the third of which is arranged to energize said third solenoid means, said third electrical circuit including a governor switch which prevents energization of said third solenoid means prior to closure of said governor switch, said governor switch being operatively connected to said governor spring and being closed by said spring only when the force exerted thereby is equal to that value which is necessary for automatic maintenance of vehicle speed at the speed occurring during actuation of the manually operable push button means.

15. In a cruise control system for an automotive vehicle having an engine and a driver operated throttle control member for controlling the fuel supply to the engine, a power unit having a pressure responsive element located therein, said pressure responsive element being operatively connected to said throttle control member for controlling movement thereof, fluid pressure means for causing movement of said pressure responsive element, means for controlling the application of said fluid pressure to said pressure responsive element, modulating valve means operatively connected to said power unit for regulating and controlling the application of said fluid pressure to said pressure responsive element, speed responsive means operatively connected to said modulating valve means for controlling movement thereof at predetermined speeds, said governor means including a variable governor load spring for determining the speed at which movement of said modulating valve means occurs, manually operable actuating means for rendering said cruise control system operable, motor means operatively connected to said variable governor load spring and said actuating means for varying and setting the effective force exerted by said governor spring to that value which is necessary for automatic maintenance of vehicle speed at the speed occurring during actuation of said manually operable means, and an electrical control circuit for rendering said motor means inoperative, said electrical control circuit including governor switch means operatively connected to said governor spring and having a first position for permitting operation of said motor means and a second position for preventing operation of said motor means, said governor switch being moved to said second position by said governor spring when the force exerted thereby is equal to that value which is necessary for automatic maintenance of vehicle speed at the speed occurring during actuation of said manually operable means.

References Cited by the Examiner

UNITED STATES PATENTS

| | | |
|---|---|---|
| 1,990,354 | 2/35 | Sylvester et al. |
| 2,157,472 | 5/39 | Bellis. |
| 2,916,100 | 12/59 | Teetor _____ 180—82.1 |
| 3,023,828 | 3/62 | Fuller et al. _____ 180—82.1 |
| 3,062,310 | 11/62 | McCathron et al. _____ 180—82.1 |

A. HARRY LEVY, *Primary Examiner.*

UNITED STATES PATENT OFFICE
CERTIFICATE OF CORRECTION

Patent No. 3,183,994

May 18, 1965

Frederick E. Goerke et al.

It is hereby certified that error appears in the above numbered patent requiring correction and that the said Letters Patent should read as corrected below.

Column 9, lines 48 and 49, strike out "and said governor spring when the reversible motor"; line 67, for "loal" read -- load --; column 10, line 16, for "forther" read -- further --; column 12, line 30, for "section" read -- second --.

Signed and sealed this 28th day of December 1965.

(SEAL)
Attest:

ERNEST W. SWIDER
Attesting Officer

EDWARD J. BRENNER
Commissioner of Patents